US006494603B1

(12) United States Patent
Takada

(10) Patent No.: US 6,494,603 B1
(45) Date of Patent: Dec. 17, 2002

(54) HEADLAMP FOR A VEHICLE

(75) Inventor: Kenichi Takada, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/616,750

(22) Filed: Jul. 14, 2000

(30) Foreign Application Priority Data

Jul. 19, 1999 (JP) .......................................... 11-204105

(51) Int. Cl.[7] .................................................. B60Q 1/00
(52) U.S. Cl. ....................................... 362/538; 362/539
(58) Field of Search ................................ 362/538, 460, 362/475, 507, 508, 509, 514, 539, 305, 303, 343, 344, 301

(56) References Cited

U.S. PATENT DOCUMENTS 4,686,610 A 8/1987 Cibié et al. .................... 362/61
4,914,747 A * 4/1990 Nino .......................... 362/539
5,180,218 A * 1/1993 Ohshio ....................... 362/538
5,243,501 A * 9/1993 Makita et al. .............. 362/510
5,276,592 A * 1/1994 Henkes ....................... 362/301
5,709,451 A * 1/1998 Flora et al. ................. 362/538

FOREIGN PATENT DOCUMENTS

EP 0624753 4/1994 ............ F21M/3/14
JP 07-029402 1/1995

* cited by examiner

*Primary Examiner*—Sandra O'Shea
*Assistant Examiner*—Bao Truong
(74) *Attorney, Agent, or Firm*—Fish & Richardson P.C.

(57) ABSTRACT

A projection 24 is integrally formed at a front surface 22*b* of a light shielding plate 22. The light shielding plate 22 is interposed between a reflector 14 and a focusing lens 18. As the reflected light from the reflector 14 is deflected or reflected upward by the projection 24, light B1 for illuminating overhead-signs is made to propagate from the focusing lens 18. A front-end portion 24*b* of the projection 24 is has a curved surface such that the portion 24*b* and an upper inclined surface 24*a* of the projection 24 are smoothly connected to each other. The front-end portion 24*b* is prevented from being seen as dark relative to the surface 24*a*, which can be seen as being brightly lit by external light.

13 Claims, 11 Drawing Sheets

HEADLAMP FOR A VEHICLE

FIELD OF THE INVENTION

The invention relates to a projector-type headlamp for a vehicle, and more particularly to a low-beam headlamp.

BACKGROUND OF THE INVENTION

In recent years, projector-type headlamps have come to be frequently adopted as headlamps for vehicles.

As shown in FIG. 1, a projector-type headlamp comprises a light source 102 disposed on an optical axis Ax of the headlamp which extends in the longitudinal direction of a vehicle, a reflector 104 for reflecting light from this light source 102 in a forward direction close to the optical axis Ax, and a focusing lens 106 disposed forwardly of the reflector 104.

Further, for using this projector-type headlamp as a low-beam headlamp, a light shielding plate 108 is provided between the focusing lens 106 and the reflector 104. The shielding plate 108 eliminates upwardly illuminating light by shielding part of the reflected light from the reflector 104. As a result, a luminous intensity distribution pattern P is formed for low beam light, showing a light-dark borderline CL, as shown in FIG. 2.

Since the upwardly illuminating light of such a projector-type headlamp is eliminated almost completely by the light shielding plate 108, an overhead sign installed above the road surface ahead of the vehicle cannot often be seen clearly.

Accordingly, an approach has been adopted, as shown in FIG. 3, to attach in the vicinity of an upper edge 108*a* an L-shaped plate 110 extending diagonally downward from a front surface 108*b* of the light shielding plate 108. Reflected light from the reflector 104 is deflected or reflected upward by an upper inclined surface 110*a* of the L-shaped plate 110. The reflected upward light propagates from the focusing lens 106 to illuminate overhead signs.

However, with the projector-type headlamp, a focal position of the focusing lens 106 is generally set at the upper edge 108*a* of the light shielding plate 108. The L-shaped plate 110 is attached to the front surface 108*b* of the light shielding plate 108 near the upper edge. Therefore, when the headlamp is viewed from a forward and slightly upper direction, the L-shaped plate 110 is seen enlarged by the lens action of the focusing lens 106, as shown in FIG. 4. External light causes the upper inclined surface 110*a* of the L-shaped plate 110 to be seen as brightly lit, while a front-end surface 110*b* of the L-shaped plate 110 remains dark. Hence, the visual appearance of the headlamp is degraded when exposed to external light.

SUMMARY OF THE INVENTION

The invention of this application has been devised in view of the above-described circumstances. The object is to provide a projector-type headlamp for a vehicle capable of obtaining light for illuminating overhead-signs without impairing the appearance of the headlamp.

In embodiments of the invention, the above object is attained by providing a structure for illuminating overhead signs.

An embodiment of the invention provides a projector-type headlamp for a vehicle comprising: a light source disposed on an optical axis of the headlamp extending in a longitudinal direction of a vehicle; a reflector for reflecting light from the light source in a forward direction close to the optical axis; a focusing lens disposed forwardly of the reflector; and a light shielding plate interposed between the focusing lens and the reflector so as to eliminate upward illuminating light by shielding part of the reflected light from the reflector, wherein a projection, which has an upper inclined surface extending diagonally downward in a forward direction and is adapted to deflect or reflect reflected light from the reflector upwardly at the upper inclined surface, is integrally formed at a front surface of the light shielding plate and at a position in a vicinity of a upper edge thereof, and a front-end portion of the projection is formed with a curved surface in such a manner as to be smoothly connected to the upper inclined surface.

The phrase "deflect or reflect . . . upwardly" means to deflect or reflect the reflected light from the reflector incident upon the upper inclined surface of the projection such that an angle of downward inclination of the reflected light becomes small, but does not necessarily mean to reflect the light upward.

As long as the aforementioned "projection" is capable of deflecting or reflecting the reflected light from the reflector in an upwardly direction and capable of allowing the light for illuminating overhead-signs to propagate from the focusing lens, an arrangement of the upper inclined surface, including its planar shape, size, the angle of downward inclination and the like, should not be limiting.

The projector-type headlamp in accordance with an embodiment of the invention is arranged such that a projection having an upper inclined surface extending diagonally downward in a forward direction is integrally formed at a front surface of the light shielding plate and in the vicinity of an upper edge of the plate, and the reflected light from the reflector is deflected or reflected upwardly from the upper inclined surface. Accordingly, light for illuminating overhead-signs can propagate from the focusing lens.

When the headlamp is observed from a forward and slightly upper direction, the projection is seen enlarged by the lens action of the focusing lens. However, when the headlamp is exposed to external light, since the front-end portion is formed with a curved surface and smoothly connected to the upper inclined surface, the front-end portion does not appear as dark relative to the upper inclined surface which is seen as brightly lit by the external light. The front-end portion can be seen as being lit with the brightness changing gradually. Moreover, since the projection is formed integrally with the light shielding plate, its front-end portion can be easily formed with a curved surface. Further, compared to the L-shaped plate attached to the light shielding plate in a conventional manner, the projection's portion connected to the general portion of the light shielding plate can be seen as integrated and uniform in terms of its external appearance.

Therefore, it is possible to provide a projector-type headlamp for a vehicle capable of generating light for illuminating overhead-signs without impairing the appearance of the headlamp.

In addition, the portion of the light shielding plate in the vicinity of its upper edge is expected to reach a high temperature since the reflected light from the reflecting surface of the reflector is concentrated there. Also, the temperature of the projection is expected to become high. However, since the projection is formed integrally with the light shielding plate, the projection is unlikely to undergo thermal deformation, and the heat from the light shielding plate can be efficiently dissipated through the projection.

Further, although the angle of downward inclination of the upper inclined surface is not limiting as described above, if the angle of downward inclination is set to 25 to 35°, the illuminating light can propagate from the focusing lens at an angle of upward inclination suitable for illuminating the overhead signs. The reason for the 25° lower-limit is that if it is set to less than 25°, the light from the upper inclined surface and a; through the focusing lens may be directed upward to a region above the overhead sign. On the other hand, the reason for the 35° upper-limit is that if it is set to more 35°, the light from the upper inclined surface and through the focusing lens may be directed downward to a region below the overhead sign.

The aforementioned "upper inclined surface" may be one whose rear-end portion extends up to the front surface of the light shielding plate or one whose rear-end portion extends halfway. Whichever case, the line of intersection between the upper inclined surface or its rearwardly extending surface and the front surface of the light shielding plate is preferably set at a position 0.5 to 3.0 mm below the upper edge of the light shielding plate. The reason for this is that if the distance is less than 0.5 mm, the intensity of light incident upon the upper inclined surface can become substantially high, and upwardly illuminating light may exceed a luminosity necessary for illuminating the overhead sign and may cause glare. On the other hand, if the distance exceeds 3.0 mm, the intensity of light incident upon the upper inclined surface can become insufficient. It can also be difficult to obtain a luminosity necessary for illuminating the overhead sign. Therefore, it is preferable to set the distance in the range of 0.5 to 3.0 mm.

Instead of using one projection, a plurality of projections can be juxtaposed transversely to obtain light suitable for illuminating overhead signs. Each projection's arrangement, its size of the upper inclined surfaces, its downward angle or the like may be appropriately set.

DETAILED DESCRIPTION OF THE INVENTION

Embodiments of the invention will be described in reference to the drawings.

Figure 1:
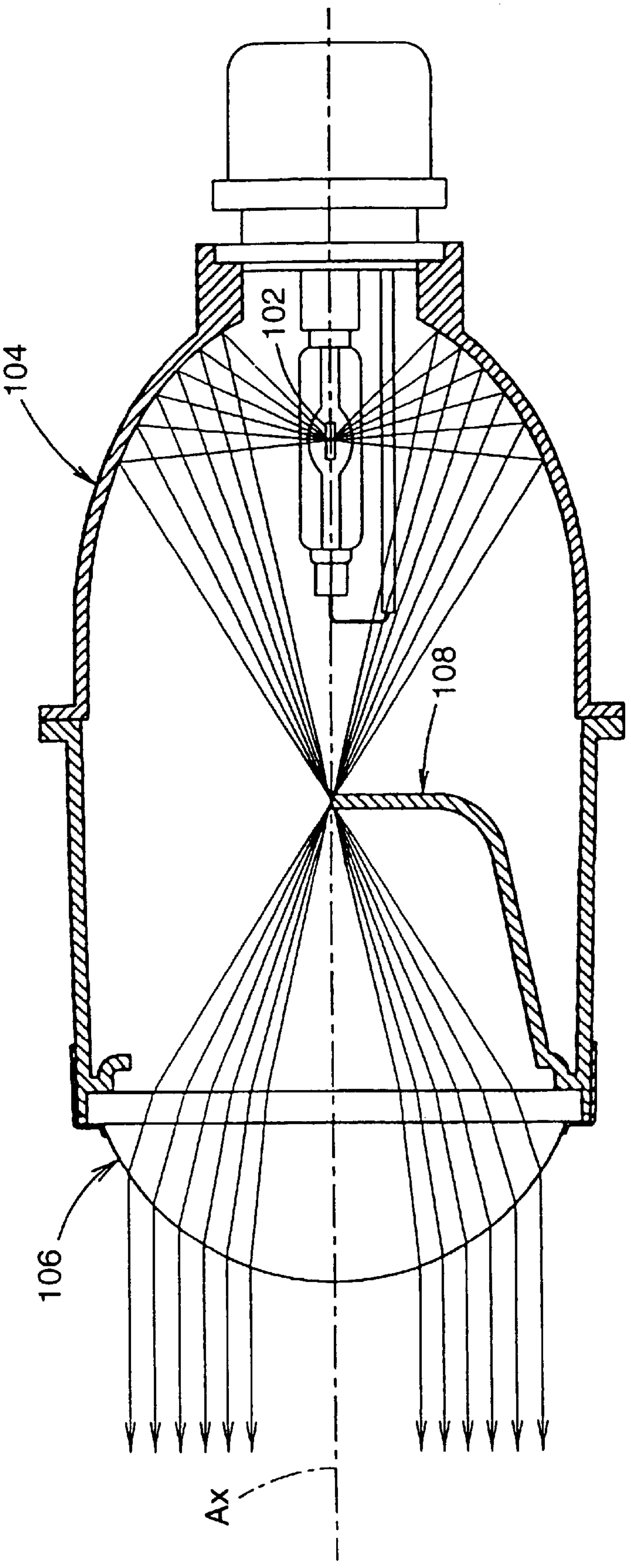
FIG. 1 (PRIOR ART)
FIG. 1 illustrates a cross-section of a known headlamp for a vehicle.
Figure 2:
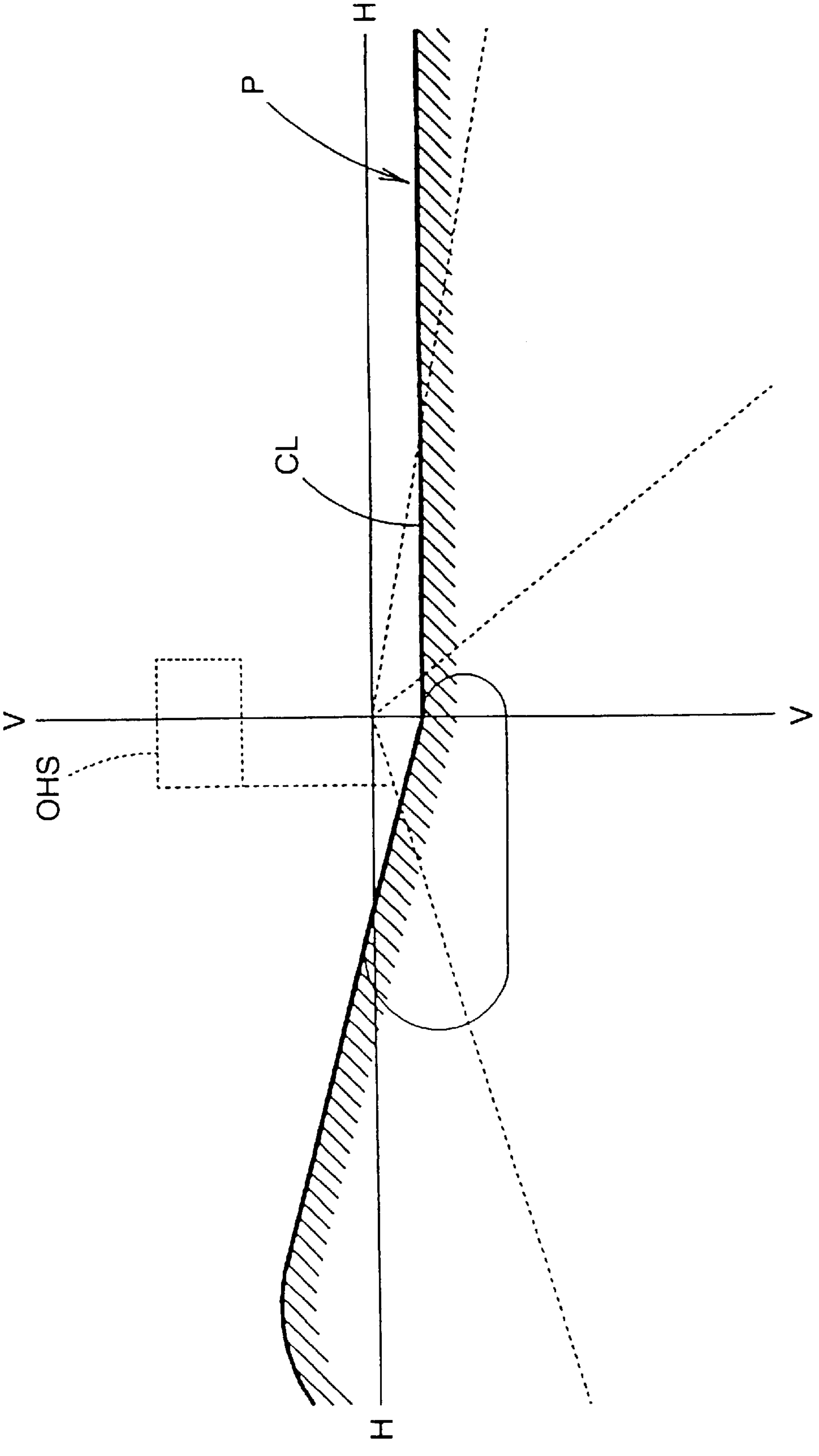
FIG. 2 (PRIOR ART)
FIG. 2 illustrates an intensity distribution pattern of a known headlamp.
Figure 3:
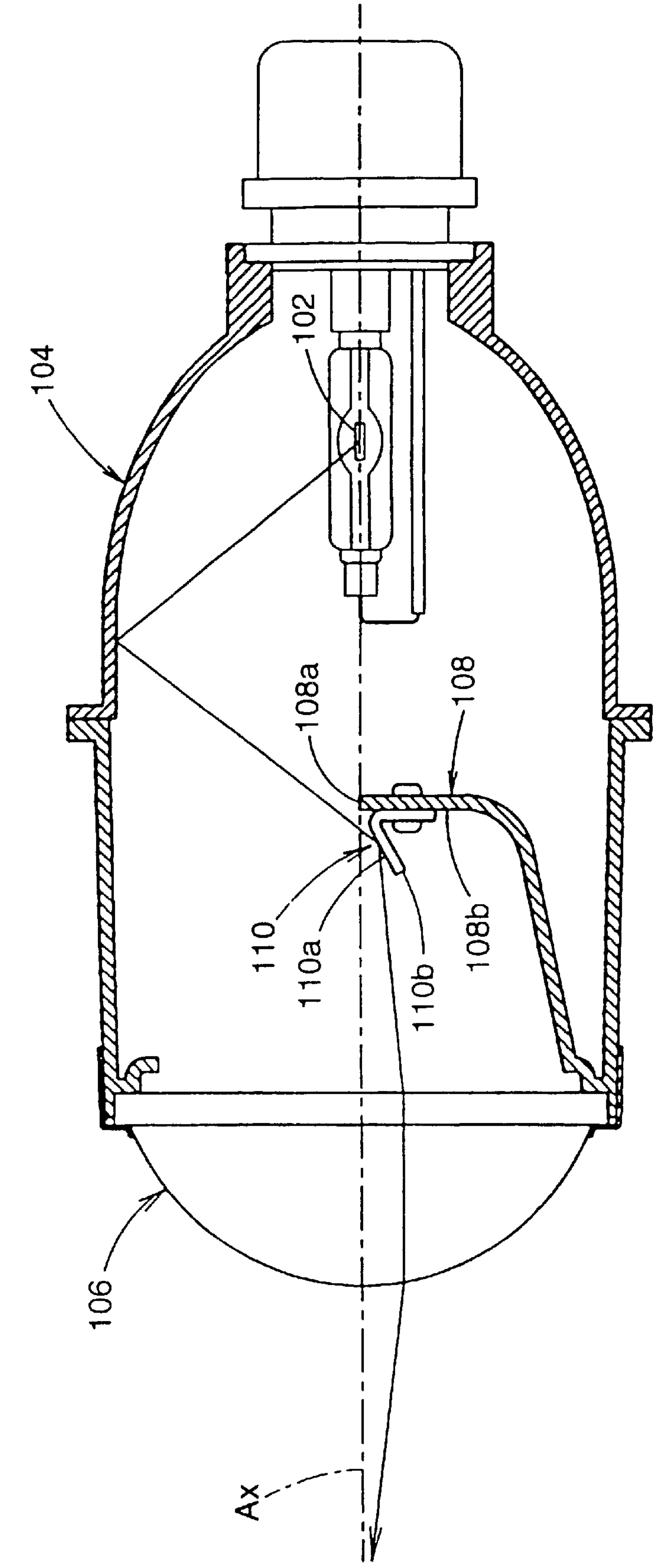
FIG. 3 (PRIOR ART)
FIG. 3 illustrates a cross-section of another known headlamp.
Figure 4:
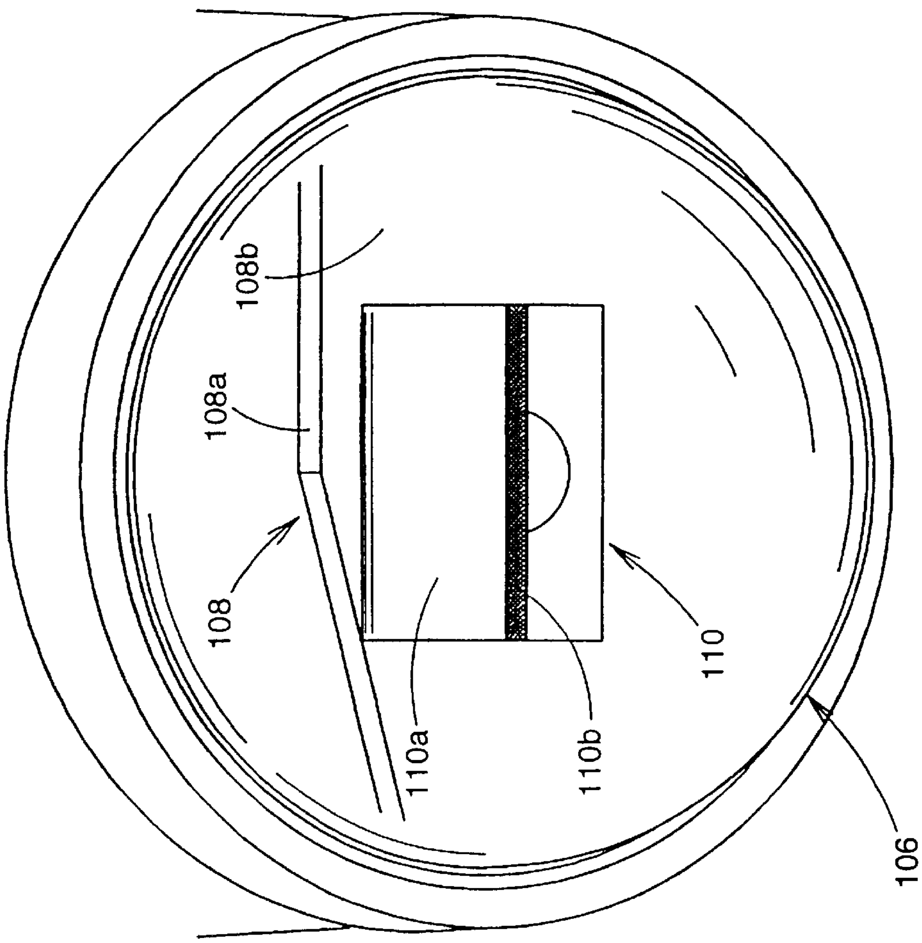
FIG. 4 (PRIOR ART)
FIG. 4 illustrates a frontal perspective view of a focusing lens of a known headlamp.
Figure 5:
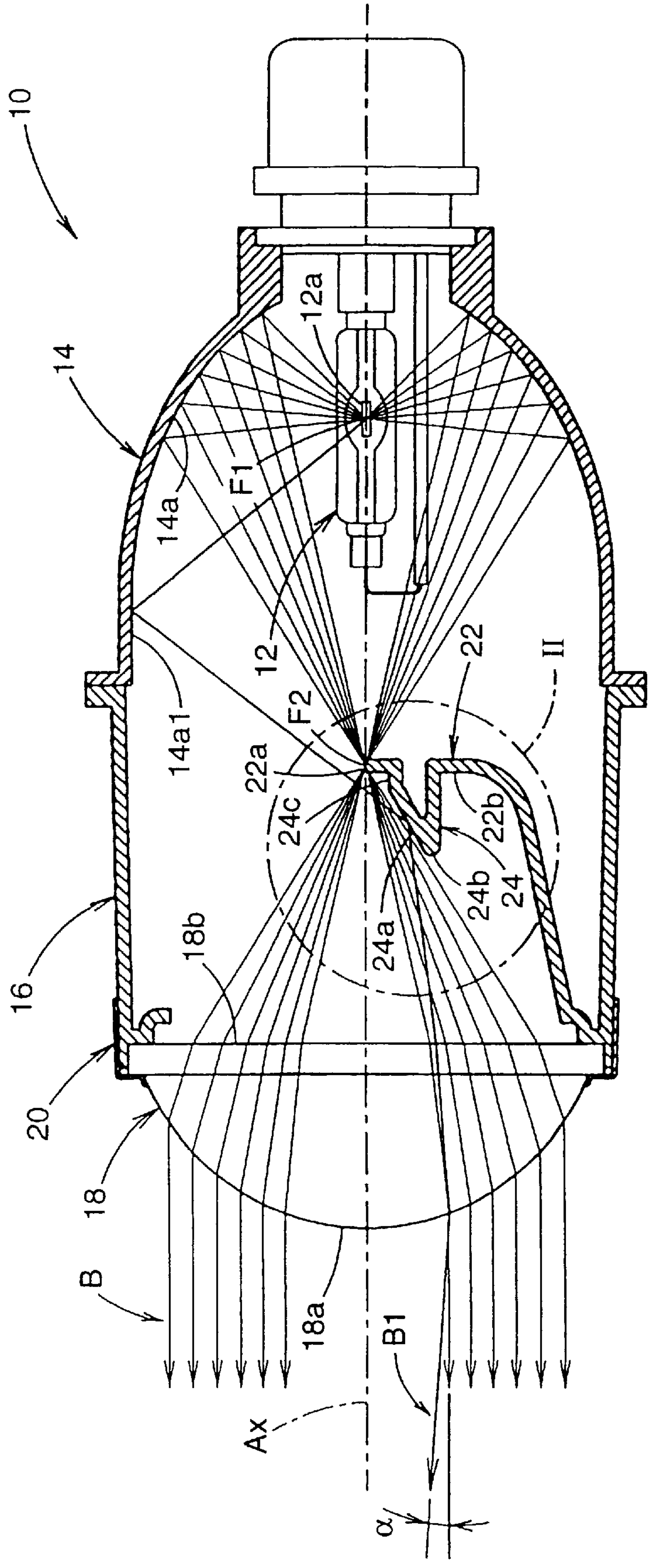
FIG. 5 illustrates a cross-section of a headlamp for a vehicle in accordance with an embodiment of the invention.
Figure 6:
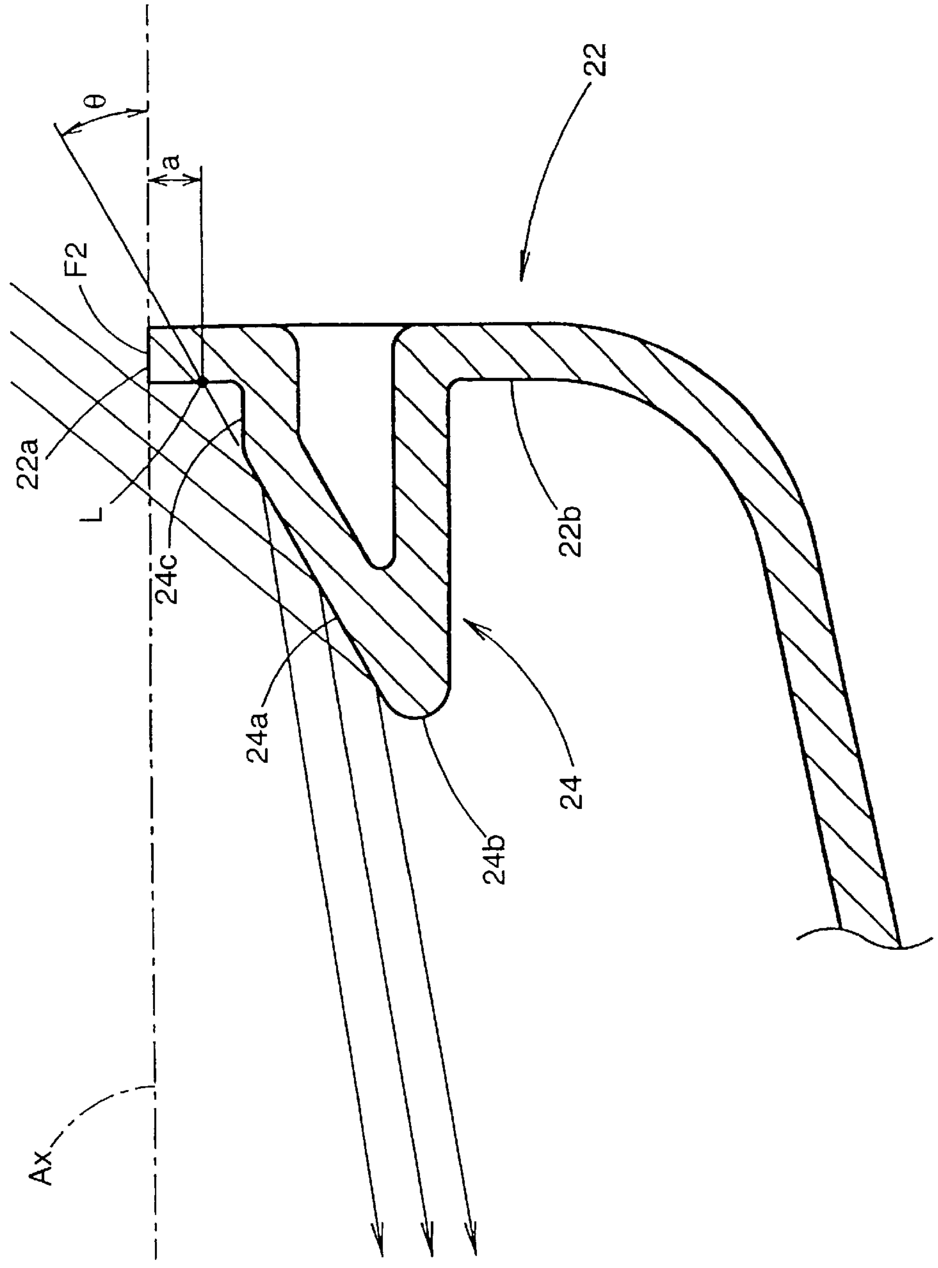
FIG. 6 illustrates an enlarged view of section II in FIG. 5.

FIG. 5 is a cross-sectional view illustrating a headlamp for a vehicle in accordance with an embodiment of the invention, and FIG. 6 is a partially enlarged view of section II in FIG. 5.

As shown in FIG. 5, a headlamp (lighting appliance) 10 is a projector-type low-beam headlamp, comprising a discharge bulb 12, a reflector 14, a holder 16, a focusing lens 18, a retaining ring 20, and a light shielding plate 22.

The discharge bulb 12 is a metal halide bulb located at a base of the headlamp, and is attached to the reflector 14 that extends from the base such that its light-emitting discharge portion 12*a* (light source) is located on an optical axis Ax of the headlamp 10. The axis Ax extends in the longitudinal direction of the vehicle.

The reflector 14 has its central axis coincide with the optical axis Ax and has a substantially ellipsoidal reflecting surface 14*a*. A cross-section of the reflecting surface 14*a* including one that passes through the optical axis Ax is elliptic. The eccentricity is arranged to become gradually larger from a vertical section toward a horizontal section. However, vertices at the rear-side of ellipses forming the respective sections are located at the same position. The light-emitting discharge portion 12*a* is disposed at a first focus F1 of the ellipsis forming the vertical section of the reflecting surface 14*a*. As a result, the reflecting surface 14*a* reflects the light from the discharge light-emitting portion 12*a* in a forward direction close to the optical axis Ax. The light substantially converges to a second focus F2 of the ellipsis in the vertical section including the optical axis Ax. However, a region 14*a*1 in the vicinity of an upper front-end of the reflecting surface 14*a* is formed by a curve that expands slightly upward with respect to the aforementioned ellipsis in the vertical section.

The holder 16 is formed by a die-cast into a tubular shape that extends forward from a front-end opening portion 14*b* of the reflector 14. The holder's rear-end portion fixes and supports the reflector 14, and the holder's front-end portion fixes and supports the focusing lens 18 through the retaining ring 20.

A plano-convex lens where its front-side surface 18*a* is convex and where its rear-side surface 18*b* is planar forms the focusing lens 18. The rear-side focal position is disposed to coincide with the second focal point F2 of the reflecting surface 14*a* of the reflector 14. As a result, the focusing lens 18 allows the reflected light from the reflecting surface 14*a* to focus close to the optical axis Ax.

The light shielding plate 22 is formed integrally with the holder 16 at a lower portion of the inner space of the holder 16. The plate 22 is adapted to eliminate the upwardly-oriented illuminating light emitted by the headlamp 10 by shielding part of the reflected light from the reflecting surface 14*a*, thereby obtaining illuminating light B for low beam substantially parallel to the optical axis Ax.

Figure 7:
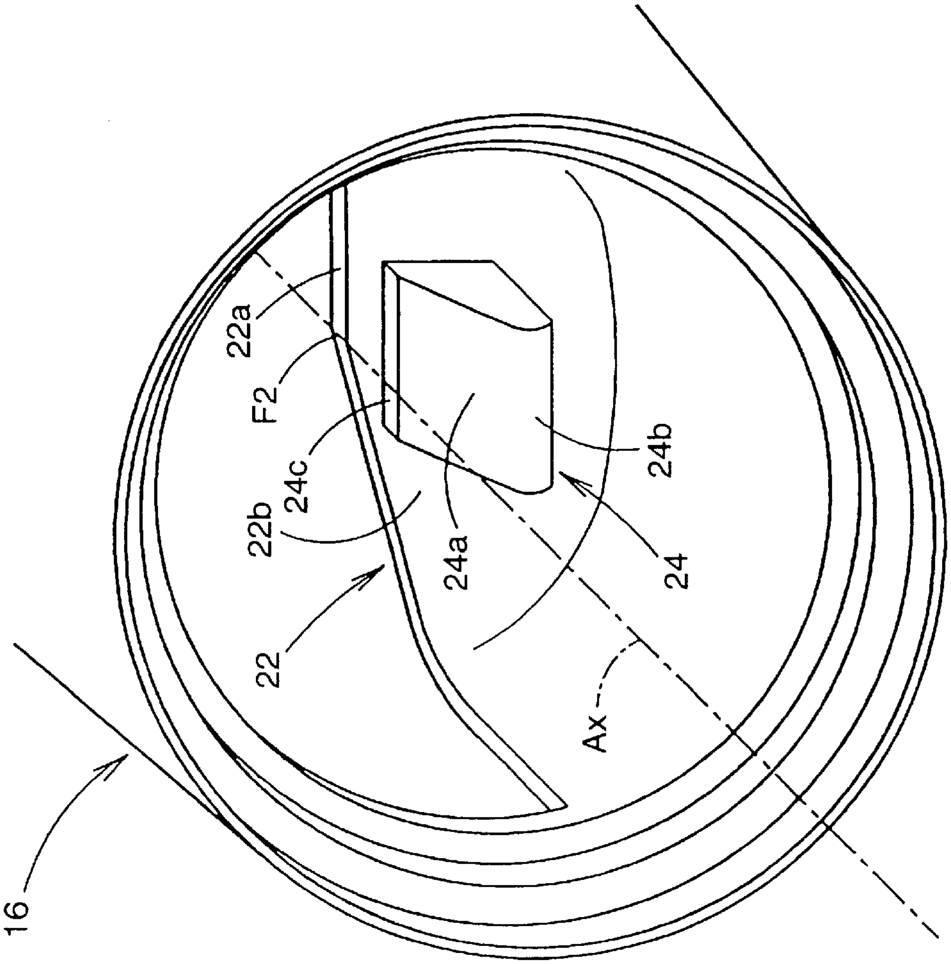
FIG. 7 illustrates a perspective view of a light shielding plate together with a portion of a holder of a headlamp according to an embodiment of the invention.

FIG. 7 is a perspective view illustrating the light shielding plate 22 together with a portion of the holder 16.

The light shielding plate 22 is formed to have its upper edge 22*a* passes through the second focus F2. The left-side region (right-side region in FIG. 7) of the optical axis Ax at the upper edge 22*a* is formed in a horizontal plane including the optical axis Ax, while the right-side region (left-side region in FIG. 7) of the optical axis Ax at the upper edge 22*a* is formed in an inclined plane extending 15° diagonally downward from the optical axis Ax.

A wedge-shaped projection 24 including an upper inclined surface 24*a* that extends diagonally downward in the forward direction is integrally formed at a front surface

22*b* of the light shielding plate 22 and in the vicinity of the upper edge 22*a*. The thickness of the projection 24 is substantially the same as that of a general portion of the light shielding plate 22. As shown in FIG. 5, upper inclined surface 24*a* is arranged to reflect and deflect light upwardly from the region 14*a*1 in the vicinity of the upper fronted of the reflecting surface 14*a* of the reflector 14. Consequently, the light B1 for illuminating overhead-signs is made to propagate from the focusing lens 18.

A downward angle θ of the upper inclined surface 24*a* shown in FIG. 6 is set to 25 to 35° (e.g., approximately 30°) so that an upward angle α of the illuminating light B1 with respect to the general light beam B becomes 4 to 6° (e.g., approximately 5°).

As shown in FIG. 6, being smoothly connected to the upper inclined surface 24*a*, a front-end portion 24*b* of the projection 24 is formed with a curved surface. The front-end portion 24*b* has a cylindrical shape extending in the horizontal direction, and its radius of curvature is set to 0.5 to 2.0 mm (e.g., approximately 1 mm).

Meanwhile, the rear-end portion of the upper inclined surface 24*a* is connected to the front surface 22*b* of the light shielding plate 22 through a horizontal surface 24*c*. Further, a distance a between the upper edge 22*a* of the light shielding plate 22 and a line of intersection L between a rearwardly extended surface of the upper inclined surface 24*a* and the front surface 22*b* of the light shielding plate 22 is set to 0.5 to 3.0 mm (e.g., approximately 1.5 mm). If the distance a were less than 0.5 mm, the intensity of light incident on the upper inclined surface 24*a* may substantially increase, and upward illuminating light may exceed an intensity of light necessary for illuminating overhead signs, causing a glare. If the distance α exceeds 3.0 mm, the intensity of light incident on the upper inclined surface 24*a* may become insufficient.

Further, in this embodiment, to secure a sufficient intensity of light necessary for illuminating overhead signs, the extent of forward projection of the projection 24 from the front surface 22*b* of the light shielding plate 22 is set to 12 to 16 mm (e.g., approximately 14 mm), the left-and-right width of the projection 24 is set to 12 to 16 mm (e.g., 14 mm or thereabouts), and the back-and-forth width of the horizontal surface 24*c* is set to 2 to 4 mm (e.g., approximately 3 mm).

Figure 8:
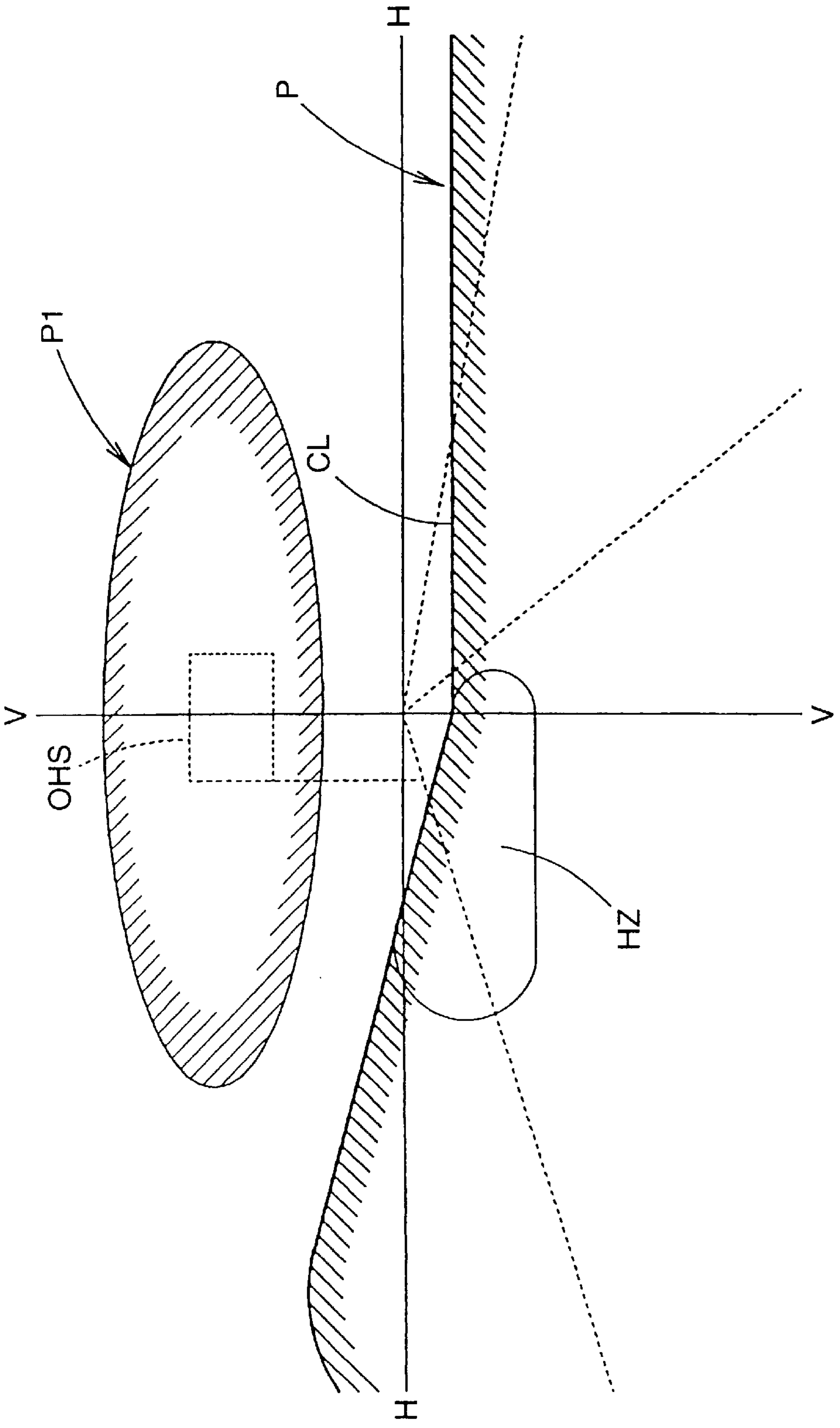
FIG. 8 illustrates a low-beam intensity distribution pattern of light from a headlamp according to an embodiment of the invention.

FIG. 8 is a diagram illustrating a portion of a luminous intensity distribution pattern derived from illuminating light emanating forwardly from the headlamp 10.

As shown in the drawing, the luminous intensity distribution pattern for a low beam comprises a basic luminous intensity distribution pattern P and an additional luminous intensity distribution pattern P1.

The basic distribution pattern P is derived from the illuminating light B for a low beam and has a light-dark border CL onto which a shape of the upper edge 22*a* of the light shielding plate 22 is projected. As for the border CL, the side close to the opposite-lane is formed by a horizontal cutoff line, and its own side is formed by an oblique cutoff line which rises at 15° toward the left side from the aforementioned horizontal cutoff line. A hot zone (high intensity region) HZ of the basic distribution pattern P is formed in the vicinity of the lower side of a right end portion of the oblique cutoff line of the border CL.

The additional luminous intensity distribution pattern P1 is formed by the illuminating light B1 and is formed in the shape of an island at an upper space of the basic luminous pattern P in front of the headlamp. As a result, an overhead sign OHS installed above the road surface can be illuminated.

Next, a description will be given on the operation of this embodiment.

The projection 24 having the upper inclined surface 24*a* that extends diagonally downward in the forward direction is integrally formed at the front surface 22*b* of the light shielding plate 22 and in the vicinity of the upper edge 22*a*. The upper inclined surface 24*a* 4 of the projection 24 is arranged to reflect and deflect light upwardly that is reflected from the region 14*a*1 in the vicinity of the upper front-end of the reflecting surface 14*a* of the reflector 1. The illuminating light B1 can be made to propagate from the focusing lens 18. The front-end portion 24*b* of the projection 24 is formed with a curved surface to smoothly connect the portion 24*b* to the upper inclined surface 24*a*. This type of structure can afford the following advantages during operation.

Figure 9:
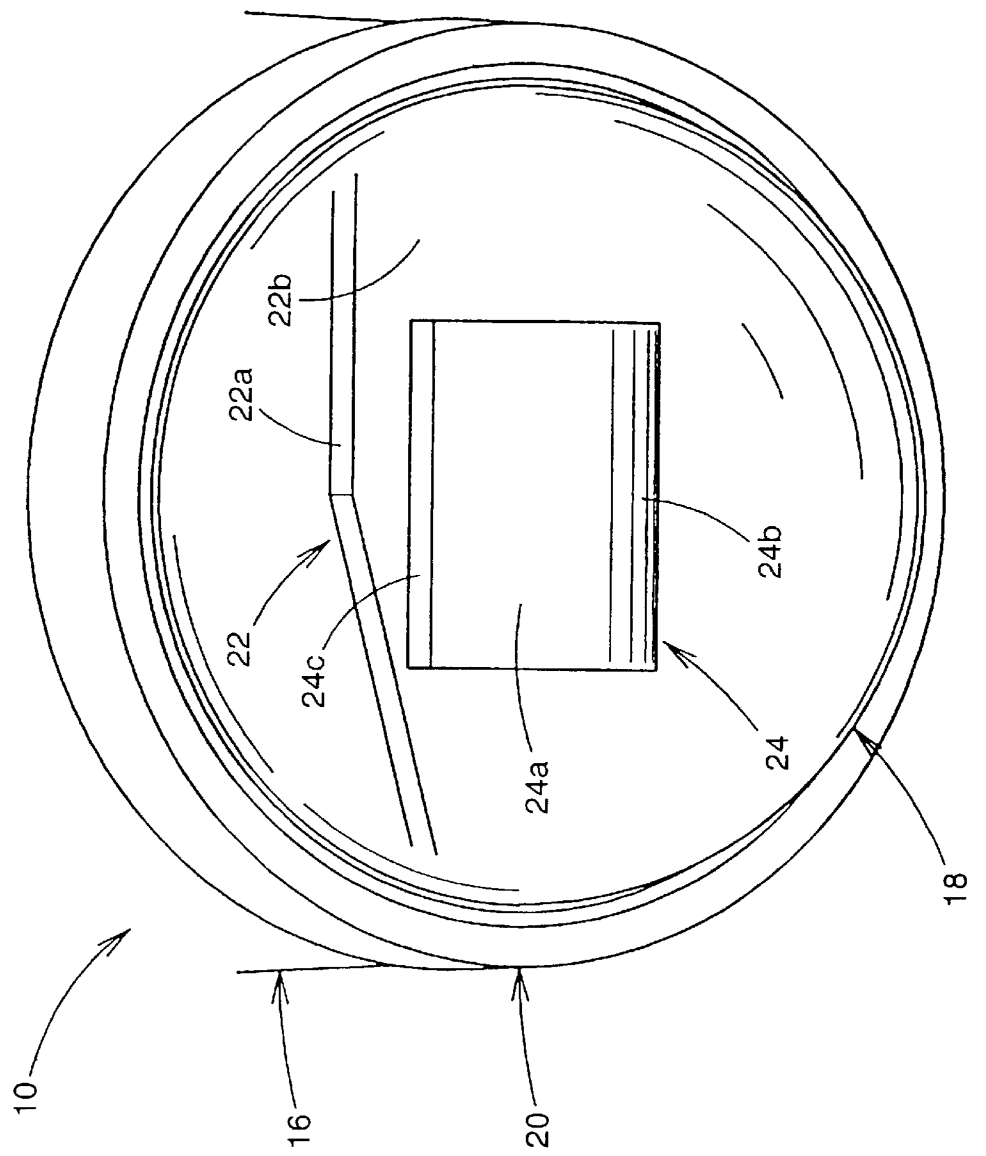
FIG. 9 is a frontal perspective view of a focusing lens of a headlamp according to an embodiment of the invention.

As shown in FIG. 9, when the headlamp 10 is observed from a forward and slightly upper direction, the projection 24 is seen enlarged by the lens action of the focusing lens 18. However, since the front-end portion 24*b* is smoothly connected to the upper inclined surface 24*a*, the front-end portion 24*b* can be prevented from being seen as dark relative to the upper inclined surface 24*a* which can be seen as being brightly lit with external light. The front-end portion 24*b* can be seen as being lit such that the brightness changes gradually. Moreover, since the projection 24 is formed integrally with the light shielding plate 22, its front-end portion 24*b* can be easily formed with a curved surface. Further, in contrast to the L-shaped plate being attached to the light shielding plate in a conventional manner, the portion of the projection 24 is smoothly connected to the general portion of the light shielding plate 22 to improve the external appearance.

Therefore, in accordance with this embodiment, in the projector-type headlamp for a vehicle, it is possible to obtain overhead-sign illuminating light without impairing the external appearance of the headlamp.

Moreover, with the headlamp 10 for a vehicle in accordance with the embodiment, the portion of the light shielding plate 22 in the vicinity of its upper edge 22*a* is likely to have a high temperature since the reflected light from the reflecting surface 14*a* is concentrated there. The temperature of the projection 24 is also likely to become high. However, since the projection 24 is formed integrally with the light shielding plate 22, the projection is unlikely to undergo thermal deformation. The heat of the light shielding plate 22 can be efficiently dissipated through the projection 24.

Further, in this embodiment, since the angle θ of the upper inclined surface 24*a* of the projection 24 is set to 25 to 35°, the illuminating light B1 can be made to propagate from the focusing lens 18 at an angle most suitable for illuminating the overhead signs.

In addition, in this embodiment, since the position of the line of intersection L between the rearwardly extended surface of the upper inclined surface 24*a* and the front surface 22*b* of the light shielding plate 22 is set at a position 0.5 to 3.0 mm below the upper edge 22*a* of the light shielding plate 22, it is possible to secure an intensity of light necessary for illuminating overhead signs without the occurrence of glare.

Figure 10:
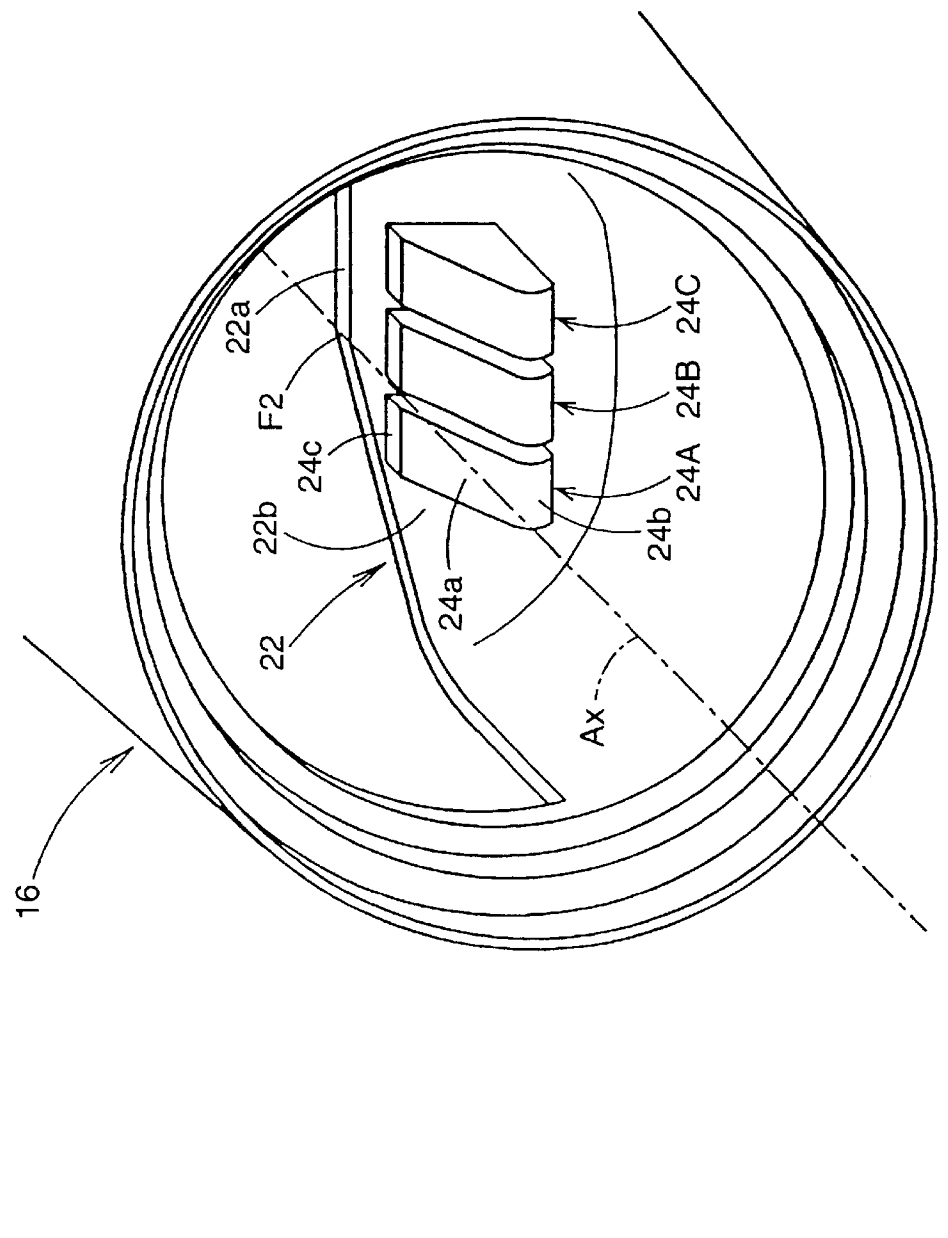
FIG. 10 illustrates a perspective view of a light shielding plate together with a portion of a holder of a headlamp according to another embodiment of the invention.

Although, in this embodiment, a description has been given of the case in which a single projection 24 is formed on the front surface 22*b* of the light shielding plate 22 and at a position in the vicinity of its upper edge 22*a*, a plurality of projections 24A, 24B, and 24C may be juxtaposed transversely on the front surface 22*b* of the light shielding plate 22 and at the position in the vicinity of its upper edge 22*a*, as shown in FIG. 10.

Figure 11:
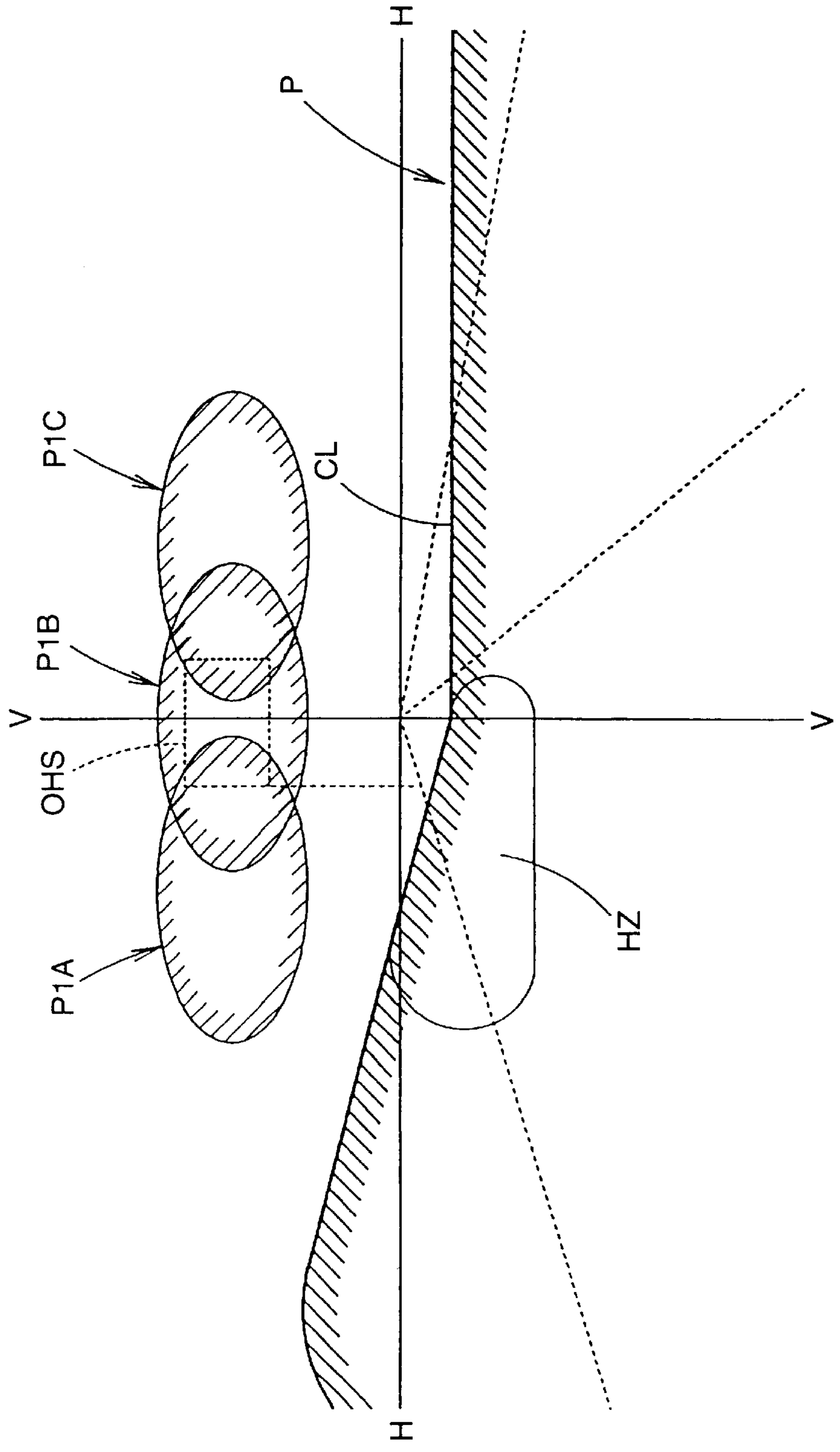
FIG. 11 illustrates a low-beam intensity distribution pattern of light from a headlamp according to another embodiment of the invention.

By setting the sizes of the upper inclined surfaces of the projections 24A, 24B, and 24C as well as their angles of downward inclination to appropriate values, it is possible to finely control the intensity of light reflected from the respective upper inclined surfaces 24*a* as well as directions of deflection and the like. Consequently, appropriate additional luminous intensity distribution patterns P1A, P1B, and P1C can be formed in a horizontal row for illuminating overhead signs, as shown in FIG. 11.

Although, in this embodiment and its modification, the projection 24 and the projections 24A, 24B, and 24C are so arranged that ridge portions of their left and right ends are angular in shape, those portions may be provided with appropriate rounded corners R in curved shape.

In the embodiment and its modification, the light-emitting discharge portion 12*a* of the discharge bulb 12 is used as the light source for the headlamp 10. However, other light sources such as a filament or the like of a halogen bulb can be used in similar arrangements to obtain operational advantages similar to those of the above-described embodiments.

Other embodiments are within the scope of the following claims:

1. A headlamp for a vehicle comprising:

a light source located at a base of the headlamp;

a reflector, for reflecting light from the light source, extending from the base;

a focusing lens disposed forwardly of the reflector and opposite to the light source; and a light shielding plate, for shielding part of the reflected light from the reflector, interposed between the focusing lens and said reflector;

wherein the shielding plate includes a projection, for reflecting or deflecting the reflected light, formed to the light shielding plate as a single continuous smooth member;

further wherein the projection has a surface leading to a curved end portion; and the surface inclines forwardly and downwardly away from a horizontal plane including the light source, and curves inwardly in a direction to the light source, said surface reflecting or deflecting the reflected light upwardly.

2. The headlamp of claim 1 wherein an angle of the downwardly inclined surface is 25 to 35° from the horizontal.

3. The headlamp of claim 1 wherein the projection is located in the vicinity of an upper edge of the light shielding plate.

4. The headlamp of claim 1 wherein an intersection of a line extending from the downwardly inclined surface and a front surface of the light shielding plate is 0.5 to 3.0 mm below the upper edge of the light shielding plate.

5. The headlamp of claim 1 further comprising:

additional projections juxtaposed laterally on the light shielding plate for providing adjustments to the directions of the reflected light.

6. A headlamp for a vehicle comprising:

a light source disposed on an optical axis of the headlamp extending in a longitudinal direction of the vehicle;

a reflector for reflecting light from the light source in a forward direction close to the optical axis;

a focusing lens disposed forwardly of the reflector;

a light shielding plate interposed between the focusing lens and the reflector for shielding part of the reflected light from the reflector; and a projection having an upper inclined surface extending diagonally downward in a forward direction and formed at a front surface of the light shielding plate as a single continuous smooth member and in the vicinity of an upper edge of the light shielding plate; the projection adapted to deflect or reflect the reflected light from said reflector upwardly at the inclined surface; and the projection having a front-end portion formed with a curved surface in such a manner as to be smoothly connected to the upper inclined surface.

7. The headlamp for a vehicle according to claim 6 wherein an angle of downward inclination of the upper inclined surface is set to 25 to 35°.

8. The headlamp for a vehicle according to claim 6 wherein an intersection of a line extending from the upper inclined surface and a front surface of the light shielding plate is set at a position 0.5 to 3.0 mm below the upper edge of the light shielding plate.

9. The headlamp for a vehicle according to claim 7 wherein an intersection of a line extending from the upper inclined surface and a front surface of the light shielding plate is set at a position 0.5 to 3.0 mm below the upper edge of the light shielding plate.

10. The headlamp of claims 6 wherein additional projections are juxtaposed transversely and integrated on the light shielding plate.

11. The headlamp of claims 7 wherein additional projections are juxtaposed transversely and integrated on the light shielding plate.

12. The headlamp of claims 8 wherein additional projections are juxtaposed transversely and integrated on the light shielding plate.

13. The headlamp of claims 9 wherein additional projections are juxtaposed transversely and integrated on the light shielding plate.

* * * * *